US007033136B2

(12) United States Patent
Botrel et al.

(10) Patent No.: US 7,033,136 B2
(45) Date of Patent: Apr. 25, 2006

(54) COOLING CIRCUITS FOR A GAS TURBINE BLADE

(75) Inventors: Erwan Botrel, Alfortville (FR); Patrice Eneau, Moissy Cramayel (FR)

(73) Assignee: Snecma Moteurs, Paris (FR)

( * ) Notice: Subject to any disclaimer, the term of this patent is extended or adjusted under 35 U.S.C. 154(b) by 85 days.

(21) Appl. No.: 10/895,855

(22) Filed: Jul. 22, 2004

(65) Prior Publication Data

US 2005/0025623 A1 Feb. 3, 2005

(30) Foreign Application Priority Data

Aug. 1, 2003 (FR) .................................. 03 09535

(51) Int. Cl.
*F01D 5/18* (2006.01)

(52) U.S. Cl. .................................... 415/115; 416/97 R

(58) Field of Classification Search ................ 415/115; 416/96 R, 97 R See application file for complete search history.

(56) References Cited

U.S. PATENT DOCUMENTS 5,342,172 A * 8/1994 Coudray et al. .......... 416/97 R
5,395,212 A 3/1995 Anzai et al.
6,174,133 B1 1/2001 Bunker
6,257,831 B1 7/2001 Papple et al.
6,264,428 B1 * 7/2001 Dailey et al. ............ 416/97 R
6,533,547 B1 * 3/2003 Anding et al. ............ 416/97 R
6,595,748 B1 * 7/2003 Flodman et al. .......... 416/97 R
6,769,866 B1 * 8/2004 Kannefass et al. .......... 415/115
6,773,230 B1 * 8/2004 Bather et al. ............ 416/97 R
2002/0164250 A1 11/2002 Chung et al.

FOREIGN PATENT DOCUMENTS

| | | |
|---|---|---|
| FR | 981 719 | 5/1951 |
| FR | 1 090 194 | 3/1955 |
| FR | 2 765 265 | 12/1998 |
| FR | 2 829 174 | 3/2003 |
| WO | WO 98/45577 | 10/1998 |

* cited by examiner

*Primary Examiner*—Edward K. Look
*Assistant Examiner*—Igor Kershteyn
(74) *Attorney, Agent, or Firm*—Oblon, Spivak, McClelland, Maier & Neustadt, P.C.

(57) ABSTRACT

A gas turbine blade of a turbomachine includes in its central portion a centrally-located first cooling circuit at least a suction side cavity, at least a pressure side cavity, at least a central cavity extending between the suction side cavity and the pressure side cavity, a first air admission opening at a radially bottom end of the suction side cavity, a second air admission opening at a radially bottom end of the pressure side cavity, at least a first passage putting a radially top end of the suction side cavity into communication with a radially top end of the central cavity, at least a second passage putting a radially top end of the pressure side cavity into communication with the radially top end of the central cavity, and outlet orifices opening out both into the central cavity and into the pressure side face of the blade.

14 Claims, 4 Drawing Sheets

COOLING CIRCUITS FOR A GAS TURBINE BLADE

BACKGROUND OF THE INVENTION

The present invention relates to gas turbine blades for a turbomachine. More particularly, the invention relates to cooling circuits for such blades.

It is known that the moving blades of a turbomachine gas turbine, and in particular of the high pressure turbine, are subjected to very high temperatures from the combustion gases when the engine is in operation. These temperatures reach values that are well above those that can be withstood without damage by the various parts that come into contact with said gases, thereby limiting the lifetime of said parts.

It is also known that raising the temperature of the gas in the high pressure turbine increases turbomachine efficiency, i.e. the ratio of thrust from the engine over the weight of an airplane propelled by said turbomachine. Consequently, efforts are made to provide turbine blades that are capable of withstanding ever-higher temperatures.

In order to solve this problem, it is general practice to provide such blades with cooling circuits seeking to reduce their temperature. By means of such circuits, cooling air which is generally inserted into the blade via its root travels along the blade following a path formed by cavities made in the blade, and is then ejected via orifices that open out into the surface of the blade.

Thus, French patent No. 2 765 265 proposes a set of turbine blades each cooled by a helical strip, by means of an impact system, and by means of a system of bridges. Although the cooling appears to be satisfactory, such circuits are complex to make and it is found that the heat exchange produced by the flow of cooling air is not uniform, thereby leading to temperature gradients that penalize the lifetime of the blade.

OBJECT AND SUMMARY OF THE INVENTION

The present invention thus seeks to mitigate such drawbacks by proposing a gas turbine blade having cooling circuits that enable the mean temperature of the blade to be lowered and that avoid forming temperature gradients, in order to increase the lifetime of the blade.

To this end, the invention provides a gas turbine blade for a turbomachine, the blade having an aerodynamic surface which extends radially between a blade root and a blade tip, which surface presents a leading edge and a trailing edge interconnected by a pressure side face and by a suction side face, and is closed at the blade tip by a transverse wall, said aerodynamic surface extending radially beyond said transverse wall so as to form a bathtub, the blade further comprising, in its central portion, a centrally-located first cooling circuit comprising: at least one suction side cavity extending radially on the suction side of the blade; at least one pressure side cavity extending radially on the pressure side of the blade; at least one central cavity extending radially in the central portion of the blade between the suction side cavity and the pressure side cavity; a first air admission opening at a radially bottom end of the suction side cavity to feed cooling air to said suction side cavity; a second air admission opening at a radially bottom end of the pressure side cavity to feed cooling air to said pressure side cavity; at least one first passage putting a radially top end of the suction side cavity into communication with a radially top end of the central cavity; at least one second passage putting a radially top end of the pressure side cavity into communication with the radially top end of the central cavity; and outlet orifices opening out both into the central cavity and into the pressure side face of the blade.

Such a centrally-located first cooling circuit for the blade enables the mean temperature of the blade to be reduced while also reducing temperature gradients so as to increase the lifetime of the blade.

Preferably, the transverse wall of the blade has a plurality of emission holes opening out into the pressure side, suction side, and central cavities of the first cooling circuit and also opening out into the bathtub of the blade.

Such emission holes thus enable air films to be established in the bottom of the bathtub of the blade in order to protect it against hot gas.

Advantageously, the pressure side and suction side cavities of the first cooling circuit include bridges extending between their side walls in order to increase internal heat exchange.

Such bridges also serve to establish heat sink for transferring heat from the cavity wall that is in contact with the hot gas to the cooler wall of the cavity which is in contact with the central cavity, thus limiting the creation of temperature gradients in the blade.

Still advantageously, the pressure side cavity and the suction side cavity of the first cooling circuit have a large aspect ratio so as to increase internal heat transfer.

The turbine blade advantageously includes second and third cooling circuits which are independent of each other and of the first cooling circuit. They serve respectively to cool the trailing edge and the leading edge of the blade.

BRIEF DESCRIPTION OF THE DRAWINGS

Other characteristics and advantages of the present invention appear from the following description given with reference to the accompanying drawings which show an embodiment having no limiting character. In the figures.

DETAILED DESCRIPTION OF AN EMBODIMENT

Figure 1:
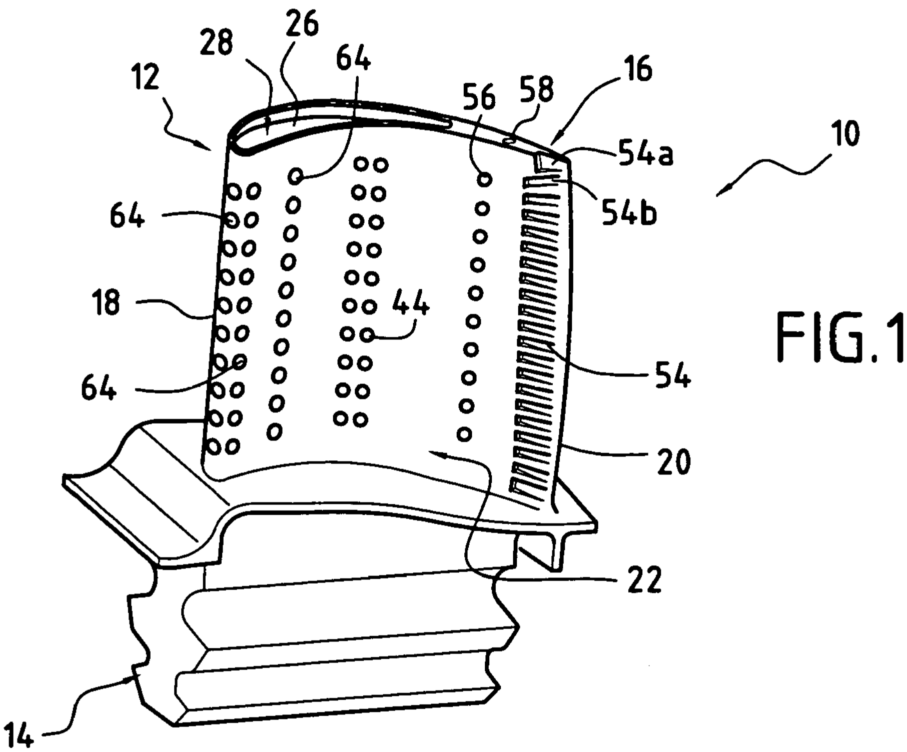
FIG. 1 is a perspective view of a turbine blade of the invention.

FIG. 1 shows a moving blade 10, e.g. made of metal, for a high-pressure turbine of a turbomachine. Naturally, the present invention can also be applied to other blades of the turbomachine, whether moving or stationary.

The blade 10 has an aerodynamic surface 12 which extends radially between a blade root 14 and a blade tip 16. The blade root 14 is for mounting on a disk of the rotor of the high pressure turbine.

The aerodynamic surface 12 presents four distinct zones: a leading edge 18 placed facing the flow of hot gases coming from the combustion chamber of the turbomachine; a trailing edge 20 opposite from the leading edge 18; a pressure side face 22; and a suction side face 24, these side faces 22 and 24 interconnecting the leading edge 18 and the trailing edge 20.

At the blade tip 16, the aerodynamic surface 12 of the blade is closed by a transverse wall 26. In addition, the aerodynamic surface 12 extends radially slightly beyond said transverse wall 26 so as to form a cup 28, referred to below as the blade "bathtub". This bathtub 28 thus possesses a bottom which is formed by the transverse wall 26, a side wall formed by the aerodynamic surface 12, and it is open towards the blade tip 16.

According to the invention, the blade 10 as formed in this way presents a centrally-located first cooling circuit A for cooling the blade.

Figure 2:
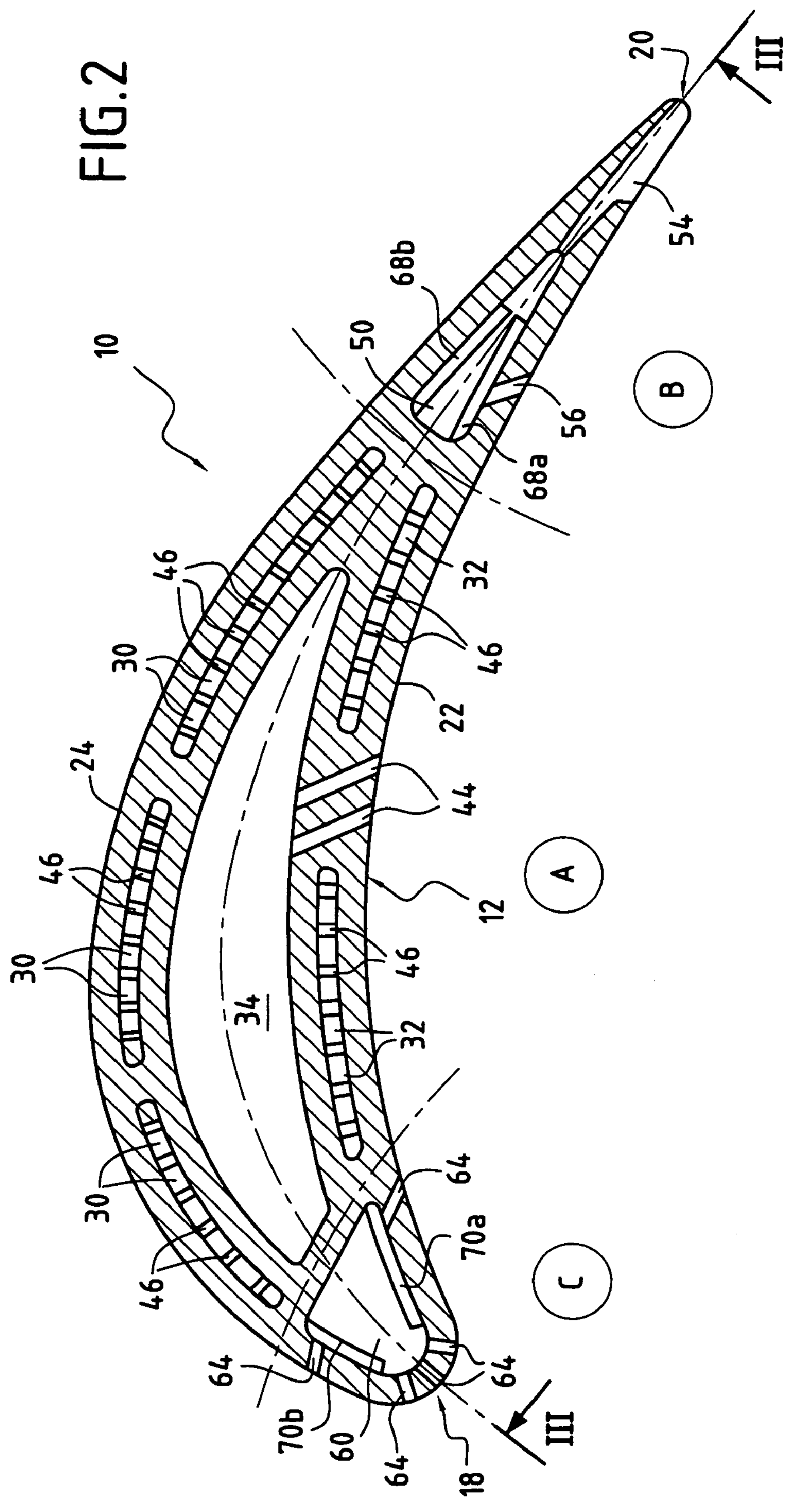
FIG. 2 is a cross-section view of the FIG. 1 blade.

As shown in FIG. 2, the first cooling circuit A comprises in particular at least one suction side cavity 30 extending radially beside the suction side 24 of the blade, at least one pressure side cavity 32 extending radially beside the pressure side 22 of the blade, and at least one central cavity 34 extending radially in the central portion of the blade between the suction side cavity 30 and the pressure side cavity 32.

Figure 4:
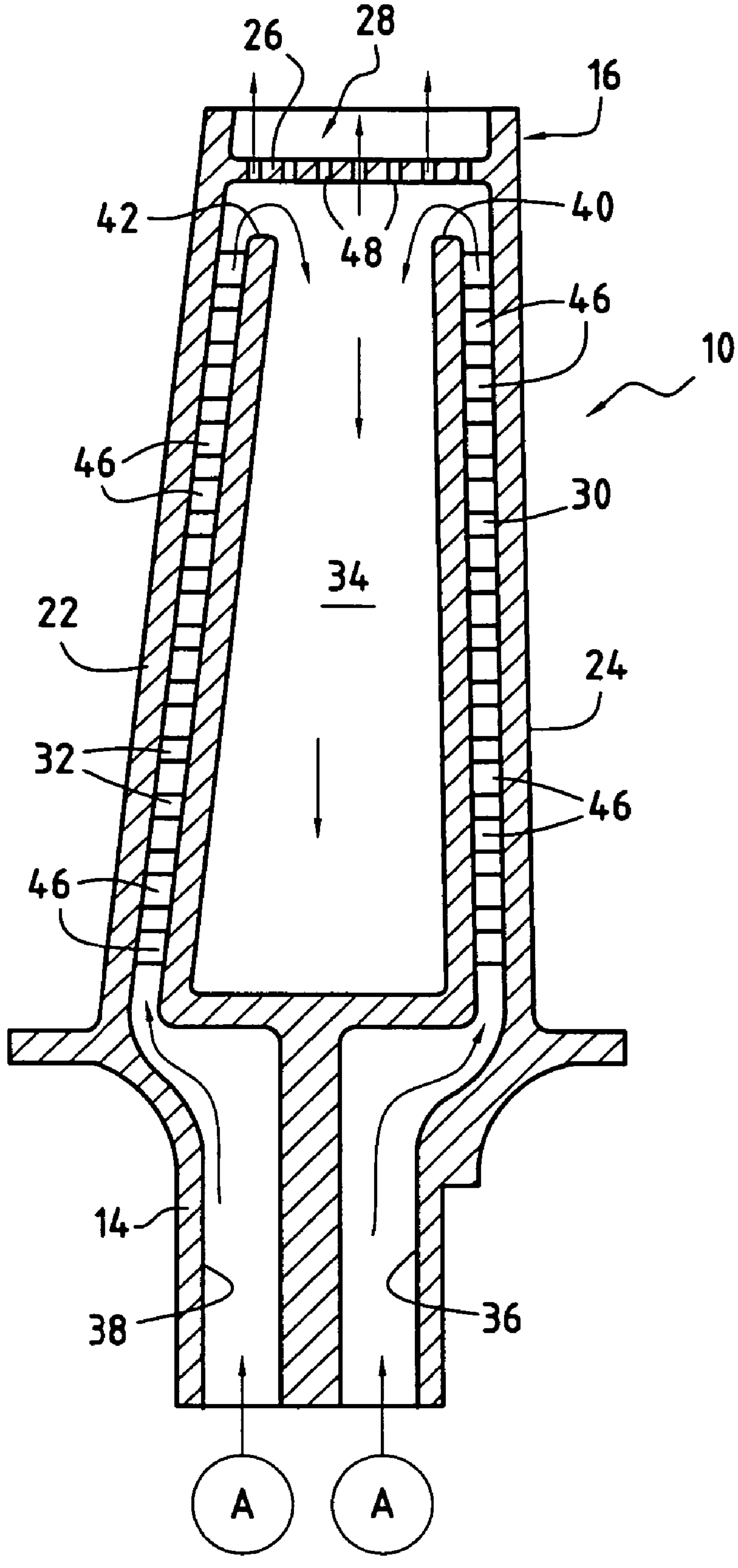
FIG. 4 is a section view on line IV—IV of FIG. 3.

As shown in FIG. 4, the suction side and pressure side cavities 30 and 32 extend radially from the transverse wall 26 forming the bottom of the bathtub 28 down to the blade root 14. The central cavity 34 extends likewise from the transverse wall 26 but over only a fraction of the height of the blade. The central cavity 34 is also the cavity having the largest size in the leading edge to trailing edge direction.

A first air admission opening 36 is provided at a radially bottom end of each suction side cavity 30 (i.e. in the vicinity of the blade root 14) in order to feed the suction side cavity 30 with cooling air. Similarly, a second air admission opening 38 is provided at a radially bottom end of each pressure side cavity 32 in order to feed the pressure side cavity 32 with cooling air.

At least one first passage 40 enables the top radial end of the suction side cavity 30 (i.e. at the blade tip 16) to communicate with a top radial end of the central cavity 34. Similarly, at least one second passage 42 puts a top radial end of the pressure side cavity 32 into communication with the top radial end of the central cavity 34.

These first and second passages 40 and 42 thus enable a cavity to be formed that extends between the pressure side and suction side faces 22 and 24, which cavity is provided beneath the bathtub 28 of the blade.

Finally, the first cooling circuit A includes outlet orifices 44 opening out both into the central cavity 34 and into the pressure side face 22 of the blade. In the cross-section plane of FIG. 2, these outlet orifices 44 are two in number.

According to an advantageous characteristic of the invention, the pressure side and suction side cavities 30 and 32 of the first cooling circuit A have a high aspect ratio so as to increase internal heat transfer. A cooling cavity is considered as having a high aspect ratio when, in cross-section, it presents one dimension (length) that is at least three times its other dimension (width).

According to another advantageous characteristic of the invention, the suction side and pressure side cavities 30 and 32 of the first cooling circuit A are provided with bridges 46 extending between their side walls. As shown in FIGS. 2 and 4, the bridges 46 extend across the suction side and pressure cavities, thereby creating links between their side walls that are in contact with the hot gases and their side walls that are in contact with the central cavity 34.

The bridges serve to increase turbulence in the flow of cooling air in the cavities, thereby increasing the effectiveness of cooling. They also enable the heat exchange area between the cooling air and the aerodynamic surface of the blade to be increased.

In addition, the bridges create heat sinks which transfer heat from the hot wall of the cavity in contact with the hot gas to the cooler wall of the cavity in contact with the central cavity 34, thereby making blade temperatures more uniform, limiting temperature gradients within the blade, and consequently increasing the lifetime of the blade.

The shape of the bridges 46 (diameter, pitch, section, disposition, etc.) can vary in order to match the thermal conditions of the blade to dimensioning constraints thereof. Thus, the bridges may be of arbitrary section, e.g. cylindrical, square, or oblong. The bridges may also be disposed in a staggered configuration or in line over the entire height of the cavity.

According to another advantageous characteristic of the invention, the transverse wall 46 forming the bottom of the bathtub 28 is provided with a plurality of emission holes 48 opening out into the suction side, pressure side, and central cavities 30, 32, and 34 of the first cooling circuit A and also opening out into the bathtub 28.

The emission holes 48 thus enable the cooling air flowing in the suction side and pressure side cavities to cool the bathtub 28 of the blade. The bathtub is a hot zone which is subjected to turbulent flow of hot gas and it needs to be cooled.

In the embodiment shown in the figures, it should be observed that the first cooling circuit A has three suction side cavities 30 and two pressure side cavities 32. The pressure side and suction side cavities are fed with air independently of one another, so it is possible to vary the number of such cavities as a function of dimensioning criteria for the blade. The number and size of the cavities may also be adapted to enable outlet orifices 44 to be placed between the central cavity 34 and the hot gas stream.

It should also be observed that the first cooling circuit A does not have any outlet orifices opening out to the suction side 24 of the blade. Injecting cooling air downstream from the throat defined by the blade degrades the efficiency of the turbine.

Furthermore, the blade 10 also has a second cooling circuit B which is independent of the first cooling circuit A.

Figure 3:
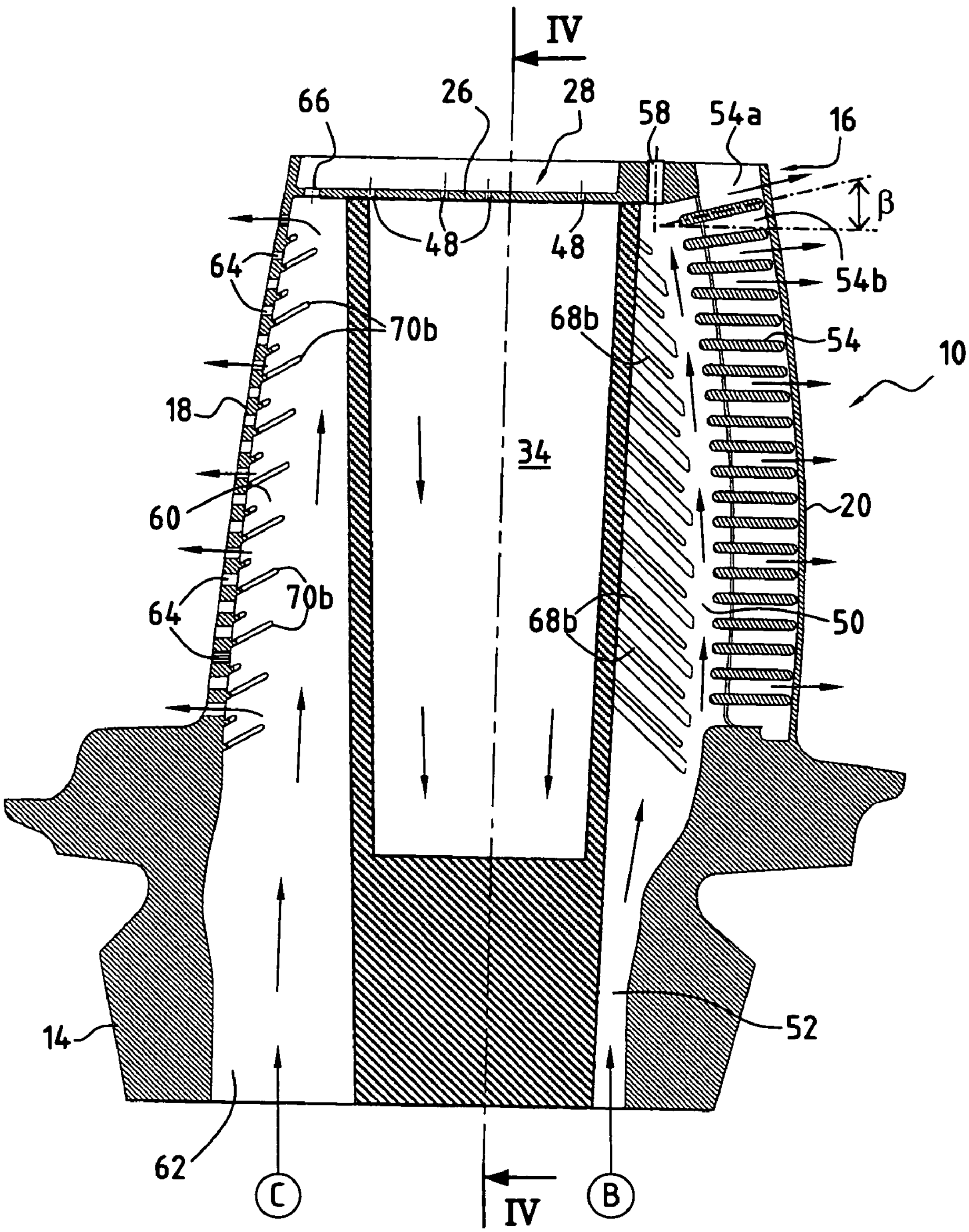
FIG. 3 is a section view on line III—III of FIG. 2.

As shown in FIGS. 2 and 3, the second cooling circuit B comprises at least a trailing edge cavity 50 extending radially in the vicinity of the trailing edge 20 of the blade 10. This trailing edge cavity 50 extends radially from the blade root 14 to the transverse wall 26 forming the bottom of the bathtub 28 of the blade.

The second cooling circuit B also comprises, at a radially bottom end of the trailing edge cavity 50, an air admission opening 52 for feeding the trailing edge cavity 50 with cooling air.

Finally, a plurality of outlet slots 54 open out both into the trailing edge cavity 50 and into the pressure side face 22 of the blade 10 in order to exhaust cooling air.

In addition to the outlet slots 54, the second cooling circuit B may also have a plurality of additional outlet orifices 56 opening out both into the trailing edge cavity 50 and also into the pressure side face 22 of the blade.

These additional outlet orifices 56 shown in FIGS. 1 and 2 enable cooling of the trailing edge 20 of the blade to be improved by forming a film of cool air flowing along the pressure side face 22 of the blade.

At the blade tip 16, the second cooling circuit B advantageously includes at least one emission hole 58 through the transverse wall 26 opening out both into the trailing edge cavity 50 and into the blade tip 16.

This or these emission hole(s) 58 thus enable the cooling air flowing in the trailing edge cavity 50 to cool the side wall of the bathtub 28 of the blade. The emission hole(s) 58 also serve(s) to exhaust dust and impurities coming from the cooling air, that might otherwise close off the outlet slots 54 and the additional outlet orifices 56.

Still according to an advantageous characteristic of the invention, at least one outlet slot 54*a* that is the slot closest to the blade tip 16 slopes at an angle of inclination β towards the blade tip 16, with the other outlet slots 54 typically remaining substantially parallel to the axis of the turbomachine (FIG. 3).

Such an angle of inclination β is defined relative to the axis of the turbomachine (not shown). By way of example, the angle of inclination may lie in the range 5° to 50°, and preferably in the range 10° to 30°, relative to said turbomachine axis.

This angle of inclination β towards the blade tip 16 preferably applies to the two outlet slots 54*a*, 54*b* that are closest to the blade tip 16 (see FIG. 3), the other outlet slot 54 remaining substantially parallel to the axis of the turbomachine.

Having this or these outlet slots 54*a* (54*b*) inclined in this way serves to improve the cooling of the trailing edge 20 of the blade 10 at the blade tip 16. The outlet slots 54*a*, 54*b* closest to the blade tip 16 are open towards the blade tip 16 (a zone where static pressure is greater than in the zone downstream from the trailing edge), so the expansion ratio is improved compared with conventional outlet slots opening out solely downstream from the trailing edge.

The turbine blade 10 also has a third cooling circuit C which is independent of the first and second cooling circuits A and B. This third cooling circuit C serves to cool the leading edge 18 of the blade.

As shown in FIGS. 2 and 3, the third cooling circuit C includes at least one leading edge cavity 60 extending radially in the vicinity of the leading edge 18 of the blade 10. This leading edge cavity 60 extends radially from the blade root 14 to the transverse wall 26 forming the bottom of the bathtub 28 of the blade (see FIG. 3).

An air admission opening 62 is provided at a radially bottom end of the leading edge cavity 60 in order to feed the leading edge cavity 60 with cooling air. Finally, the third cooling circuit C includes outlet orifices 64 opening out both into the leading edge cavity 60 and into the leading edge 18 on the pressure side face 22 and the suction side face 24 of the blade.

At the transverse wall 26, the third cooling circuit C preferably includes at least one emission hole 66 opening out both into the leading edge cavity 60 and into the bathtub 28 of the blade. This emission hole 66 serves to contribute to cooling the bathtub 28 and to causing cooling air to circulate from the blade tip 16 towards the bathtub 28.

Advantageously, the emission hole 66 presents a right section that is greater than that of the outlet orifices 64 of the third cooling circuit C so as to exhaust dust and impurities coming from the cooling air that might otherwise close off the outlet orifices 64.

Certain characteristics common to the second and third cooling circuits B and C of the turbine blade of the invention are described briefly below.

According to one of these common characteristics, the trailing edge cavity 50 and/or the leading edge cavity 60 include(s) baffles on their pressure and suction side walls so as to increase heat transfer on these walls.

Thus, in FIGS. 2 and 3, the trailing edge cavity 50 presents baffles 68a on its pressure side wall and baffles 68*b* on its suction side wall. Similarly, the leading edge cavity 60 has baffles 70*a* on its pressure side wall and baffles 70*b* on its suction side wall.

As shown in FIGS. 2 and 3, the baffles 68*a*, 68*b*, 70*a*, and 70*b* of the trailing edge and leading cavities 50 and 60 can be ribs that are advantageously inclined at about 45° relative to the flow direction of the cooling air flowing in these cavities.

In addition, the pressure side baffles 68*a*, 70*a* can slope in a direction opposite to the suction side baffles 68*b*, 70*b*. In which case, the dispensers 68*a*, 70*a* disposed on the pressure side of the trailing edge cavity 50 or of the leading edge cavity 60 are preferably radially offset (i.e. disposed in a staggered configuration) relative to the baffles 68*b*, 70*b* disposed on the suction side wall.

Alternatively, the baffles 68*a*, 68*b*, 70*a*, and 70*b* may be spikes disposed in a staggered configuration or in line, for example.

Whatever their shape and disposition, the baffles 68*a*, 68*b*, 70*a*, and 70*b* serve to increase turbulence in the flow of air in the cavities in order to increase internal heat transfer.

It should also be observed that the baffles 70*b*, 70*b* disposed in the leading edge cavity 60 of the third cooling circuit C may be with or without overlap. Overlap consists in placing the baffles in such a manner that the pressure side baffle 70*a* of the leading edge cavity 60 cross the suction side baffle 70*b* of the leading edge cavity.

In the vicinity of the leading edge 18 of the blade 10, cooling is mainly provided by pumping heat via the outlet orifices 64. In addition, the presence of baffles 70*a*, 70*b* in the leading edge cavity 60 can make it difficult to machine the outlet orifices 64 and also to feed them with cooling air (i.e. when an outlet orifice is situated immediately behind or crossing a baffles).

According to another characteristic common to the second and third cooling circuits B and C, the additional outlet orifice 56 of the second cooling circuit B and 64 of the third cooling circuit C may be of arbitrary section: cylindrical, oblong, flared, etc. The diameter and the pitch (radial distance between two successive orifices) of these outlet orifices 56, 64 are also adapted so as to optimize cooling of the side faces 22, 24 of the blade 10.

In general, the additional outlet orifices 56 of the second circuit B and 64 of the third circuit C enable cooling air to be exhausted into the hot gas stream from the cavity (trailing edge cavity 50 or leading edge cavity 60). The air emitted in this way forms a film of cool air which protects the aerodynamic surface 12 of the blade 10 against the hot gas coming from the combustion chamber.

Figure 5:
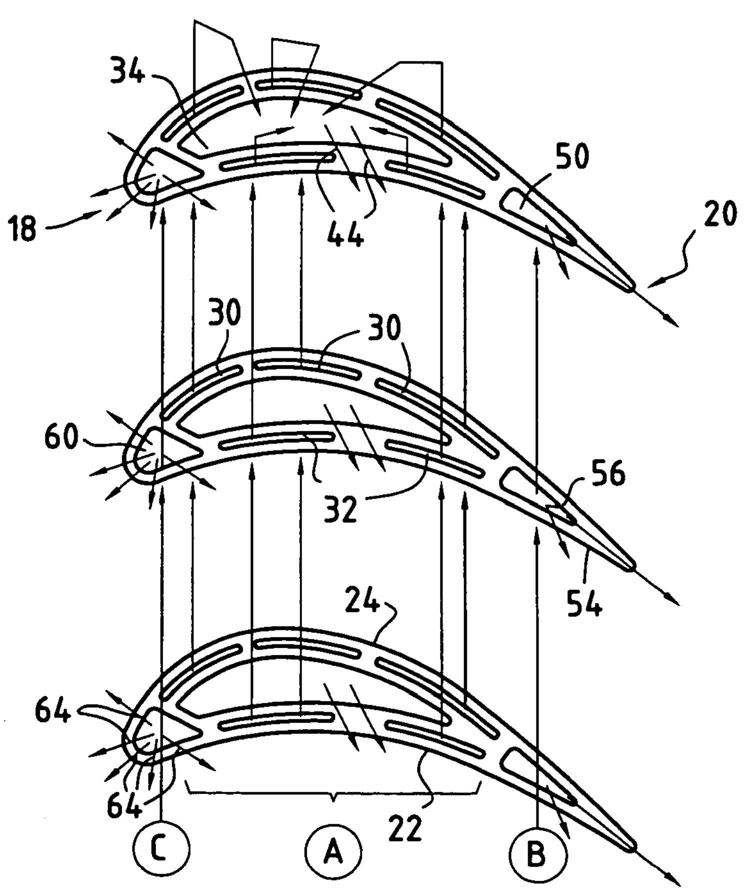
FIG. 5 shows the cooling air flow associated with the various cooling circuits of the FIG. 1 blade.

The way in which the blade is cooled stems clearly from the description given above, and is described briefly below with reference more particularly to FIG. 5.

This figure is a diagram showing the flows of cooling air traveling along the various circuits A to C of the blade 10. These cooling circuits are independent of one another since each of them has its own direct cooling air feed.

The centrally-located first cooling circuit A is fed with cooling air via the suction side and the pressure side cavities 30 and 32. The air travels along these cavities 30, 32 from the blade root 14 towards the blade tip 16, and provides cooling by convective heat exchange against the bottom of the bathtub 28 via the emission holes 48 prior to feeding the central cavity 34 at the transverse wall 26. The air then flows along the central cavity 34 in a radial direction opposite from that in which it flows in the suction side and pressure side cavities 30 and 32. Finally, the air is emitted to the pressure side of the blade via the outlet orifices 44 of said central cavity.

It should be observed that the suction side and pressure side cavities 30 and 32 are independent of each other so the rate at which cooling air flows may differ from one cavity to another.

The second cooling circuit B is fed with cooling air by the trailing edge cavity 50. The air thus travels along the trailing edge cavity 50 from the blade root 14 towards the blade tip 16 while being emitted in the vicinity of the trailing edge 20 on the pressure side of the blade, via the outlet orifices 54, and possibly via the additional outlet orifices 56.

Similarly, the third cooling circuit C is fed with cooling air via the leading edge cavity 60. The air thus travels along the leading edge cavity 60 from the blade root 14 towards the blade tip 16 while being emitted in the vicinity of the leading edge 18 to the pressure side, to the suction side, and to the leading edge of the blade via the outlet orifices 64.

Compared with conventional turbine blade cooling circuits, the present invention thus makes it possible for the blades to operate at higher temperatures at the inlet to the turbine.

For constant turbine operating conditions, the invention makes it possible to increase blade lifetime by reducing its mean temperature. Similarly, for constant lifetime, the invention makes it possible to reduce the flow rate needed for cooling the blade, thereby increasing the efficiency of the turbine.

The presence of bridges in the suction side and pressure side cavities of the central cooling circuit makes it possible to provide the blade with better mechanical strength by providing a connection between the wall that is in contact with the hot gas and the wall that is in contact with the central cavity.

The central cooling circuit also makes it possible, in the central portion of the blade, to have a cavity formed under the bathtub of the blade. This characteristic makes it possible to position the emission holes in the zones that most need to be cooled without any other constraint, thereby simplifying cooling of the bottom of the bathtub. It also presents the advantage of simplifying the machining of the emission holes by making it possible to accept greater tolerance in the positioning of the holes.

In the central portion of the blade, the presence of emission holes enables cooling to be performed by thermal pumping in the transverse wall that forms the bottom of the bathtub of the blade. These emission holes also create films of air that protect the side faces of the blade against the hot gas.

At the trailing edge of the blade, the presence of one or two outlet slots that are inclined towards the blade tip makes it possible to cool the trailing edge at the blade tip. It also makes it possible to improve cooling in the top portion of the trailing edge cavity.

What is claimed is:

1. A gas turbine blade for a turbomachine, the blade having an aerodynamic surface which extends radially between a blade root and a blade tip, which surface presents a leading edge and a trailing edge interconnected by a pressure side face and by a suction side face, and is closed at the blade tip by a transverse wall, said aerodynamic surface extending radially beyond said transverse wall so as to form a bathtub, the blade further comprising, in its central portion, a centrally-located first cooling circuit comprising:

at least one suction side cavity extending radially on the suction side of the blade;

at least one pressure side cavity extending radially on the pressure side of the blade;

at least one central cavity extending radially in the central portion of the blade between the suction side cavity and the pressure side cavity;

a first air admission opening at a radially bottom end of the suction side cavity to feed cooling air to said suction side cavity;

a second air admission opening at a radially bottom end of the pressure side cavity to feed cooling air to said pressure side cavity;

at least one first passage putting a radially top end of the suction side cavity into communication with a radially top end of the central cavity;

at least one second passage putting a radially top end of the pressure side cavity into communication with the radially top end of the central cavity; and outlet orifices opening out both into the central cavity and into the pressure side face of the blade.

2. A blade according to claim 1, further comprising a second cooling circuit independent of the first cooling circuit, said second cooling circuit comprising:

at least one trailing edge cavity extending radially beside the trailing edge of the blade;

an air admission opening at a radially bottom end of the trailing edge cavity to admit cooling air into said trailing edge cavity; and outlet slots opening out both into the trailing edge cavity and into the pressure side face of the blade.

3. A blade according to claim 2, wherein the transverse wall of the blade includes at least one emission hole opening out both into the trailing edge cavity of the second cooling circuit and into the blade tip.

4. A blade according to claim 2, wherein at least the outlet slot closest to the blade tip presents an angle of inclination towards the blade tip relative to a longitudinal axis of the turbomachine.

5. A blade according to claim 4, wherein said angle of inclination towards the blade tip lies in the range 10° to 30° relative to said longitudinal axis of the turbomachine.

6. A blade according to claim 2, wherein the trailing edge cavity of the second cooling circuit includes baffles on its pressure side and suction side walls so as to increase heat transfer along said walls.

7. A blade according to claim 2, further comprising a third cooling circuit independent of the first and second cooling circuits, said third cooling circuit comprising:

at least one leading edge cavity extending radially in the vicinity of the leading edge of the blade;

an air admission opening at a radially bottom end of the leading edge cavity to feed cooling air into said leading edge cavity; and outlet orifices opening out both into the leading edge cavity and into the leading edge in the pressure side and in the suction side of the blade.

8. A blade according to claim 7, wherein the transverse wall of the blade includes at least one emission hole opening out both into the leading edge cavity of the third cooling circuit and into the bathtub so as to cool it.

9. A blade according to claim 8, wherein said emission hole is of right section greater than that of the outlet orifices of the third cooling circuit so as to enable impurities coming from the cooling air to be exhausted, which might otherwise close off said outlet orifices.

10. A blade according to claim 7, wherein the leading edge cavity includes baffles on its pressure side and suction side walls so as to increase heat exchange along said walls.

11. A blade according to claim 1, wherein the transverse wall of the blade includes a plurality of emission holes opening out both into the pressure side, suction side, and central cavities of the first cooling circuit and into the bathtub in order to cool it.

12. A blade according to claim 1, wherein the pressure side cavity of the first cooling circuit includes bridges extending between its side walls in order to increase internal heat transfer.

13. A blade according to claim 1, wherein the suction side cavity of the first cooling circuit includes bridges extending between its side walls in order to increase internal heat transfer.

14. A blade according to claim 1, wherein the pressure side cavity and the suction side cavity of the first cooling circuit have a high aspect ratio so as to increase internal heat transfer.

* * * * *